Sept. 9, 1941.  W. J. WILLENBORG  2,255,551
SINGLE CELL THERMAL CONDUCTIVITY MEASUREMENTS
Filed July 30, 1938
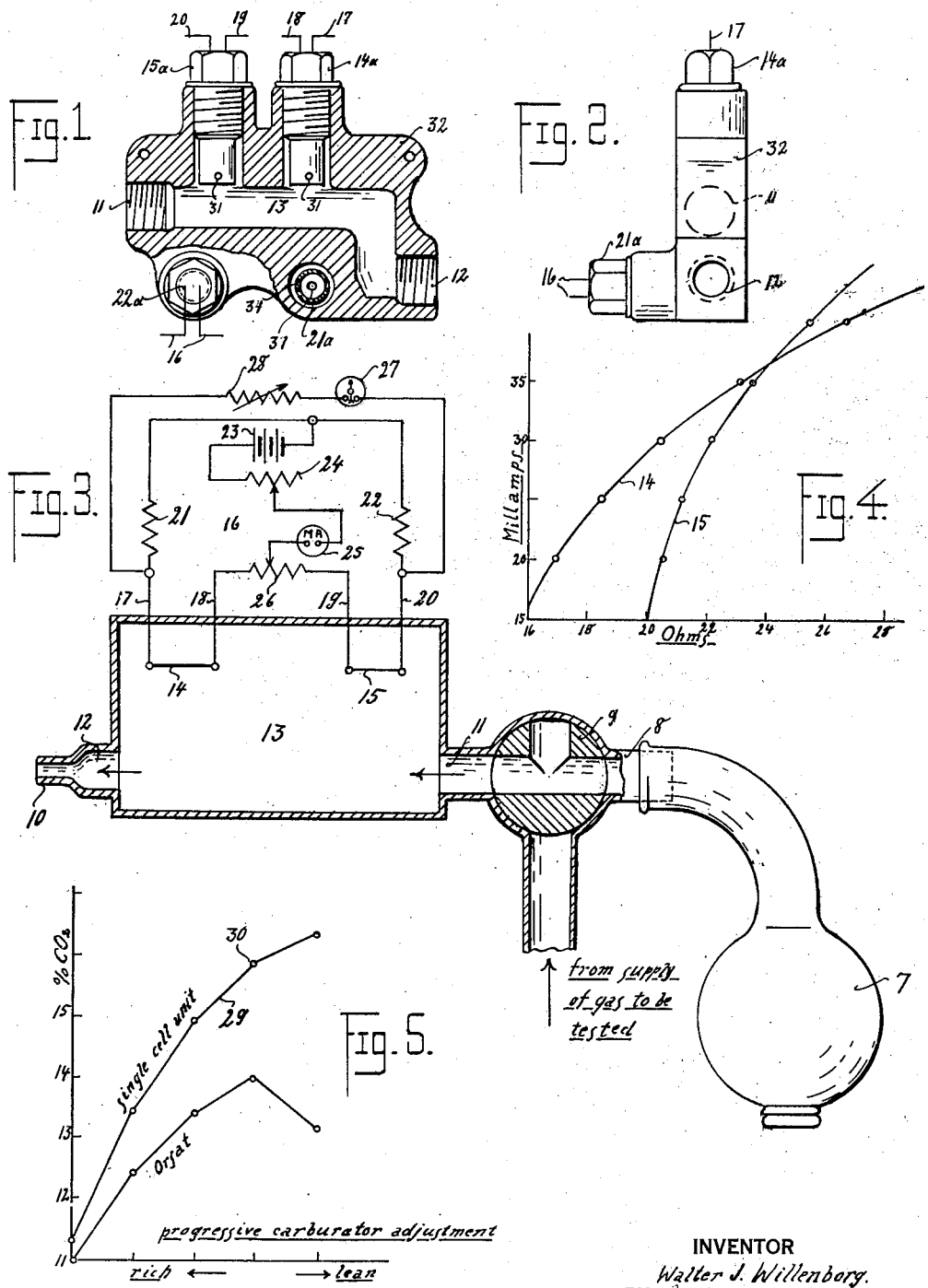
INVENTOR
Walter J. Willenborg.
BY
ATTORNEY Patented Sept. 9, 1941

2,255,551

UNITED STATES PATENT OFFICE 2,255,551

SINGLE CELL THERMAL CONDUCTIVITY MEASUREMENTS

Walter J. Willenborg, Weehawken, N. J., assignor to Monocel Inc., a corporation of Delaware Application July 30, 1938, Serial No. 222,301

16 Claims. (Cl. 73—51)

This invention concerns improvements in thermal conductivity measurements, as they find frequent use in the determination and analysis of gases.

A unit finds common use in such measurements, which comprises a plurality of cells. At least one of these cells serves as a reference cell, which accommodates a reference gas, a reference medium, e. g. air. One or more other cells serve as comparison cells, which receive the gas to be compared with the reference gas, in order to establish the thermal conductivity of the comparison gas. The reference as well as the comparison cells each contain an emitting element and a reacting element, and it is common practice to use like resistors in all cells, which serve as emitting bodies, as well as the responsive means, which serve to register heat fluctuations. In other words an electric current, which serves to heat the resistors as emitters, is measured. The current flowing through a resistor indicating its heat, and the current flowing through the reference and comparison registers are related to each other in order to establish a relation between the degree, in which the heat of the reference register has been conducted away by the reference gas, to the degree in which the comparison gas has conducted away a heat of the comparison resistor. Such a comparison is ordinarily made in a Wheatstone bridge, the reference resistor and the comparison resistor being connected as two branches or legs of the Wheatstone circuit. The instant invention will also be described by way of the commonly used Wheatstone bridge circuit, although any other measuring circuit or circuits may take the place of the Wheatstone bridge arrangement.

Measurements made in thermal conductivity measuring units of the kind just outlined are subject to errors, many of which must be ascribed to the following causes:

1. Variations of sensitiveness, as they for instance arise when the average thermal conductivity of the comparison gas is once far away from that of the reference gas, whereas, by way of contrast, the thermal conductivities of the reference gas and of the comparison gas range very close to each other at another time.

2. Fluctuations of thermal conductivity of the reference gas, which may be due to impurities, e. g. humidity. When very delicate changes of the thermal conductivity of the comparison gas are to be registered, the thermal conductivity fluctuations of the reference gas may exceed the changes of the comparison gas to be observed, so that the readings become valueless.

3. A difference of temperature of the reference cell and that of the comparison cell. It has been attempted, to overcome this difficulty, as much as possible, by careful insulation, and by combining the cells within one cell block.

4. Volumetric and other structural differences of the cell. Thus any diffeernce between the heat radiation, absorption and conduction characteristics of the cells may cause errors. A difference of convection of the gas flow by reason of difference in cell structure may also influence the readings.

5. A difference between the temperature of the reference gas and that of the gas to be analyzed are compared. Errors attributable to such a difference have been recognized and an attempt has been made to overcome these errors by elaborating upon the remedies provided under the heading 3 above, e. g. by conducting the gases to one and the same cell block, or through conduits of like temperature, before they are admitted to the reference and to the comparison cell, respectively.

6. A difference between the velocity of flow of the reference gas and that of the comparison gas.

7. A difference between the pressure of the reference gas and that of the gas to be analyzed or compared. The pressures may vary at which the reference gas and the comparison gas are passed through the respective cells. One or the other cell must also ordinarily be exposed at its entrance or at its exit to atmospheric pressure or to the reaction of atmospheric pressure, so that atmospheric pressure changes cause variations concerning the differently arranged cells. This has become of major importance of late, when thermal conductivity measurements are frequently to be executed at varying levels; for instance in connection with thermal conductivity determinations of the exhaust gases of airplane engines, which are to serve as a measure of the correctness of the fuel-air mixture, with which the engine is being charged. Particular attention will be paid to such a condition hereinafter.

8. A difference of structure involving radiation of the surface, heat and electric characteristics between the reference and the comparison resistors.

According to some of the objects of this invention, the causes of errors just enumerated are to be avoided; and that does not only mean, that the effects of such causes are not only to be remedied or overcome:

According to one feature of this invention, the use of a reference gas is eliminated altogether.

Furthermore a thermal conductivity measuring unit may be limited, according to this invention, to a single cell. It is understood that such a step by itself substantially avoids all the causes of the items 1 to 7 enumerated above.

The eighth cause of error hereinabove referred to is to be avoided herein by completely discarding a principle of the prior art by eliminating the necessity for rendering the various resistors substantially alike. As a matter of fact the difference of the various resistors, and more particularly between their thermal or electrical characteristics, or both, is the basic factor in making thermal conductivity measurement in accordance with the improved method of this invention.

Other objects of this invention will be brought forth and elucidated in the following description and the accompany drawing, both of which refer to particular examples of the invention. Such examples serve as an illustration of the invention and are not to be interpreted in limitation thereof.

According to this invention resistors of unlike characteristics are comprised in a comparison circuit. They react differently from each other when the surrounding atmospheric gas is changed in respect to thermal conductivity. Under these circumstances the two resistors may be accommodated in the same cell, which contains, or through which are passed the gas or gases to be analyzed.

In the drawing:

Fig. 1 shows an example of a cell and cell block of this invention in a cross-sectioned plan view.

Fig. 2 shows a corresponding end view.

Fig. 3 is a schematic view, illustrating the arrangement of the cell and of a wiring diagram.

The chart of Fig. 4 serves to illustrate, how the resistors may vary from each other in respect to characteristics pertaining to heat and electricity.

The chart of Fig. 5 contrasts former readings and readings obtained by this invention on the exhaust gas of an internal combustion engine.

Similar numerals refer to similar parts throughout the various views.

A gas to be tested flows through the intake opening 11 into the cell chamber 13 and passes out by way of the outlet opening 12. The gas may be fed under pressure; or it may be withdrawn at the outlet, e. g. by an aspirating pump or the like; or both.

In the drawing the gas is assumed to be pressed through the cell block from a suitable source of a sample of the gas, e. g. after the gas has been cleaned and reduced to a preferred temperature, according to the teachings of the prior art.

In the embodiment of Fig. 3 the gas passes through the cell chamber 13 under pressure, the outlet 12 being for instance provided with a constriction 10, through which the gas is released to the atmosphere. The gas arriving under pressure from a supply thereof, may be connected by way of a two-way valve 9 to the intake 11. The alternative inlet of the two-way valve 9 may serve for checking purposes; e. g. it is connected to a bulb 7, which may be manipulated and will supply a stream of air through the cell chamber 13.

In the cell chamber 13 are mounted two resistors 14 and 15, which differ from each other in respect to their thermal or electric characteristics, or both. These resistors are connected by wires 17 and 18, and 19 and 20, respectively, into a Wheatstone bridge circuit 16, in which substantially equal resistances 21 and 22 represent the second pair of branches. Whereas resistors 14 and 15 represent the first pair of branches of the Wheatstone circuit.

Current is applied to the bridge circuit 16 from a battery 23 by way of an adjustable resistance 24, the current supplied being measured by a meter 25. By way of a slide wire 26 current is introduced between the resistors 14 and 15, the return circuit connecting to a point between the resistances 21 and 22. As shown in the diagram of Fig. 3 a galvanometer 27 and a variable resistance 28 are connected in series with each other from a point between resistor 14 and resistance 21 to a point between resistor 15 and resistance 22.

When the gas to be tested passes through the cell chamber 13, it will affect the resistors 14 and 15 in such a manner, that the needle of galvanometer 27 will read on the scale, perhaps only after a suitable adjustment has been made by slide wire 26 and adjustable resistance 24.

By means of such adjustment the needle may be placed at any point on the scale of galvanometer 27. An analysis of the gas at that time—by way of a suitable chemical analysis—will disclose the nature of the gas, and the position of the galvanometer 27 should be noted for that type of gas.

In connection with a different gas the galvanometer needle will move either to the right or to the left, dependent upon the thermal conductivity of the gas; and the galvanometer may be calibrated for these other gases. Adjustments for a coarser or finer calibration may of course be made by means of the variable resistance 28.

The two other resistors 14 and 15 do not necessarily have to be different from each other in respect to material and a specific electric resistance. But they should differ from each other in respect to heat dissipation, electrical resistance at various temperatures, or both.

Using platinum wires differing from each other in respect to length and diameter for both resistors, good results were obtained with resistors which yield under like current and in a like gaseous medium—but apparently heated to different temperatures—the curves of Fig. 4.

Such resistors were also used for single cell units of this invention in tests on the exhaust gases of an internal combustion engine, in accordance with the chart of Fig. 5. The curve 29 representing single cell units of this invention is not—though it might be—in particular relationship to the markings of the ordinate, which has been calibrated in percentage of carbon dioxide. The Orsat curve represents the actual $CO_2$ contents of the exhaust gases, reaching substantially a maximum of 14 percent of $CO_2$, which curve might be substantially followed by a thermal conductivity reading of the old type, at least from the left to the maximum of $CO_2$. But at about this maximum the old conductivity measurements yielded a substantially level curve, or they declined from this maximum to the right thereof.

It is harmful for an engine, when it is operated in the lean range, i. e. substantially to the right of the maximum $CO_2$ contents. It is therefore desirable for the operator of an engine to adjust the charge admitted to the engine so that the readings substantially register to the left of maximum carbon dioxide contents, i. e. on the ascending part of the curve—rather than on the descending part to the right of the maximum $CO_2$ contents, which range substantially indicates a lean mixture. But how is an operator, who finds the $CO_2$ registration to range below the maximum, in a position to tell whether that registration is on the ascending, rich part, or in the descending, lean range of performance? This trouble appears to be remedied by the use of a single cell unit of the instant invention, in accordance with which a galvanometer needle moves and continues reading in the same direction, even after maximum carbon dioxide contents has been passed. The desirable point 30 of the single cell unit curve of Fig. 5 will of course be calibrated. When the galvanometer registers below said point, the operator knows that he is in the rich range, and he may adjust for a leaner mixture, in order to approach the best performance at point 30, or thereabout. But he will always know, that he is in the wrong, lean range, when the galvanometer registers above a point 30 of best combustion, whereupon he may immediately adjust and enrichen the mixture of the fuel, in order to obtain a preferred combustion or the preferred combustion, or in order to return into the rich range.

The galvanometer 27 may of course also show a standard marking of air. Then the operator may at all times ascertain whether the unit is in good working order by turning valve 9, so that the supply of a gas to be tested is shut off the cell is connected to the air, e. g. by way of inlet 18. Then the operator may wash out the cell chamber by manipulating bulb 7 and the galvanometer should then register the air standard.

A definite reason for the difference in behaviour between the instant single cell unit and the thermal conductivity measuring instrument compared with an air standard—as apparent from the chart of Fig. 5—is not to be advanced at this time. One point is certain: The reading of exhaust gases derived from a rich mixture may approximate, but certainly do not represent true readings of $CO_2$ contents. There are also hydrogen contents which decrease definitely, while the the $CO_2$ contents increase as we pass through a rich charge toward a lean charge. Even though the hydrogen contents are very small compared with the other components of an exhaust gas, the thermal conductivity of hydrogen is so different from that of all the other usual components, such as $CO_2$, $N_2$, $O_2$, air etc., that it may have a strong influence upon the reading. Around the point, where we pass from a rich to a lean mixture, hydrogen contents becomes substantially negligible. But another circumstance, which has already been indicated in the introduction, may also be an important factor:

At or about the turning point of the exhaust gas curve the thermal conductivity of the exhaust gases hovers very closely to that of the air reference standard. Since single cell unit readings do not refer to any standard, the relation of the ranges of the gases to be analyzed and of a reference gas are not a factor at all. It should also be considered, that in hovering close to the thermal conductivity of the reference gas, the gas to be analyzed may pass the thermal conductivity of the reference gas.

It has been customary in the art of thermal conductivity measurement to protect the very sensitive resistors. Thus threaded capsules 14a and 15a may be applied to resistors 14 and 15, and may permit the approach of the gas to the resistors accommodated upon the inside of the capsule by way of perforations 31. Similar capsules 21a and 22a may be applied to the resistances. Fig. 1 serves to illustrate what simple forms a unit of the instant invention may assume. Here we have the single cell block 32 and the entrance 11 and the exit 12 of the cell chamber 13 at opposite ends, the latter preferably a little lower in order to permit draining. The capsules 14a and 15a are threadedly inserted in the cell block 32, where they communicate with the gaseous contents of cell chamber 13. The capsules 21a and 22a are also mounted in the cell block in order to be reduced to the temperature thereof. But their contents do not communicate with a gaseous medium filling cell chamber 13.

Having thus described my invention by way of several modifications, yet I do not wish to be limited thereby, except as the state of the art and the appended claims may require, for it is obvious that various modifications and changes may be made in the form of embodiment of my invention, without departing from the spirit and scope thereof.

What I claim is:

1. An instrument for testing the composition of a gas by thermal conductivity measurements, comprising a cell serving to accommodate a gas to be tested, resistors in said cell which are made of materials chemically neutral to the gases to be tested, heating means for said resistors, and a Wheatstone bridge having legs consisting of said resistors and ballast, and serving for directly comparing said resistors.

2. An instrument for testing the composition of a gas by thermal conductivity measurements, comprising resistors made of materials chemically neutral to the gases to be tested and having electric resistances relatively changing at various temperatures, an electric measuring circuit connected for directly comparing said resistors to each other, and a single cell accommodating said resistors and having passages arranged for passing the same gas around all of said resistors.

3. An instrument for testing the composition of a gas by thermal conductivity measurements, comprising differently shaped resistors made of materials chemically neutral to the gases to be tested, a Wheatstone bridge circuit connected for directly comparing said resistors with each other, and a single cell accommodating said resistors and having passages arranged for passing the same gas around all of said resistors.

4. An intrument for testing the composition of a gas by thermal conductivity measurements, comprising differently shaped resistors made of materials chemically neutral to the gases to be tested, an electric measuring circuit connecting and for comparing said resistors with each other, and means accommodating said resistors and having passages arranged for simultaneously passing the same gas around all of said resistors.

5. An instrument for testing the composition of a gas by thermal conductivity measurements, comprising a cell serving to accommodate a gas to be tested, resistors in said cell which are made of materials chemically neutral to the gases to be tested, and a Wheatstone bridge circuit in which the branches to be compared with each other exclusively consist of said resistors.

6. An instrument for testing the composition of a gas by thermal conductivity measurements, comprising a single gas cell, resistors of different thermal characteristics in said cell, and an electric comparison circuit comprising and serving to relate to each other said resistors.

7. An instrument for testing the composition of a gas by thermal conductivity measurements, comprising a single gas cell, resistors of different thermal characteristics in said cell, an electric comparison circuit comprising and serving to relate to each other said resistors, and a two-way valve at the entrance of said cell and serving to admit at random gases from various sources to said cell.

8. An instrument for determining the completeness of combustion in an internal combustion engine by thermal conductivity measurements, comprising a passage connected with the exhaust of an engine and continuously receiving a sample of the exhaust gases, a pair of resistors of different thermal characteristics in said passage and simultaneously exposed to the gases passing therethrough, and a Wheatstone bridge circuit having said resistors as branches of the circuit and registering the difference of resistance between said resistors.

9. An instrument for determining the completeness of combustion in an internal combustion engine by thermal conductivity measurements, comprising a passage connected with the exhaust of an engine and continuously receiving a sample of the exhaust gases, a pair of resistors of different thermal characteristics in said passage and together exposed to the gases passing therethrough, a Wheatstone bridge circuit having said resistors as branches of the circuit and registering the difference of resistance between said resistors, and a pump means connected for passing air at will over said resistors in said passage.

10. A method of registering the quality of the combustion taking place in an internal combustion engine by thermal conductivity measurements, comprising passing engine exhaust gases in like manner and simultaneously over a pair of resistors made of different but chemically neutral materials, and measuring the relative changes of resistance of the resistors.

11. A method for registering the quality of the combustion taking place in an internal combustion engine by thermal conductivity measurements, comprising cleaning, cooling and simultaneously passing engine exhaust gases over a pair of resistors made of different but chemically neutral materials, and measuring the relative changes of resistance of the resistors.

12. A method of thermal conductive measurements of a gas, comprising passing said gas at one and the same time over a plurality of resistors made of different but chemically neutral materials, and registering the changes occurring in the difference of electric resistance between the resistors.

13. A method of thermal conductive measurements of a gas, comprising passing said gas simultaneously over all of a group of differently shaped resistors made of different but chemically neutral materials, and registering the changes occurring in the difference of electric resistance between the resistors.

14. A method of thermal conductive measurements of a gas, comprising simultaneously passing said gas over a plurality of resistors made of different but chemically neutral materials and having relatively changing resistances at various temperatures, and registering the changes occurring in the difference of electric resistance between the resistors.

15. A method of thermal conductive measurements of a gas, comprising passing said gas over a plurality of jointly grouped resistors made of different but chemically neutral materials, registering the changes occurring in the difference of electric resistance between the resistors, and checking for correct performance by passing a standard gas over the resistors in place of the gas to be tested.

16. A method of thermal conductive measurements of a gas, comprising passing said gas through a plurality of differently shaped resistors accommodated in a common enclosure and made of different but chemically neutral materials, and registering the changes occurring in the difference of electric resistance between the resistors.

WALTER J. WILLENBORG.